United States Patent
Wurm et al.

(10) Patent No.: US 10,622,735 B2
(45) Date of Patent: Apr. 14, 2020

(54) CABLE SEQUENCE FOR A WIRING OF AN ELECTRICAL CIRCUIT, METHOD FOR PRODUCTION AND USE

(71) Applicant: KIESLING MASCHINENTECHNIK GMBH, Dietzenbach (DE)

(72) Inventors: Kersten Wurm, Dietzenbach (DE); Jens Von Kiesling, Otzberg (DE)

(73) Assignee: RITTAL GMBH & CO. KG, Herborn (DE)

( * ) Notice: Subject to any disclaimer, the term of this patent is extended or adjusted under 35 U.S.C. 154(b) by 86 days.

(21) Appl. No.: 15/519,481

(22) PCT Filed: Oct. 15, 2015

(86) PCT No.: PCT/DE2015/100427
§ 371 (c)(1),
(2) Date: Apr. 14, 2017

(87) PCT Pub. No.: WO2016/058597
PCT Pub. Date: Apr. 21, 2016

(65) Prior Publication Data
US 2017/0229797 A1    Aug. 10, 2017

(30) Foreign Application Priority Data

Oct. 15, 2014 (DE) .......... 10 2014 114 937
Nov. 17, 2014 (DE) .......... 10 2014 116 772
Mar. 10, 2015 (DE) .......... 10 2015 103 444

(51) Int. Cl.
*H01R 11/01* (2006.01)
*H01R 11/07* (2006.01)
(Continued)

(52) U.S. Cl.
CPC .......... *H01R 11/01* (2013.01); *H01R 11/07* (2013.01); *H01R 11/28* (2013.01); *H01R 43/28* (2013.01); *H02G 1/06* (2013.01); *H02G 15/08* (2013.01)

(58) Field of Classification Search
None
See application file for complete search history.

(56) References Cited

U.S. PATENT DOCUMENTS 743,346 A * 11/1903 Swain .............. H01R 4/60
                                                  174/84 S
833,252 A * 10/1906 Schwennker ...... H01R 4/60
                                                  174/84 S
(Continued)

FOREIGN PATENT DOCUMENTS

DE    3020233 A1    12/1980
DE    33 27 583 A1   2/1985
(Continued)

OTHER PUBLICATIONS

International Search Report (in English and German) and Written Opinion (in German) dated Feb. 17, 2016; ISA/EP.

*Primary Examiner* — Timothy J Thompson
*Assistant Examiner* — Muhammed Azam
(74) *Attorney, Agent, or Firm* — Harness, Dickey & Pierce, P.L.C.

(57) ABSTRACT

A cable sequence for wiring of an electrical circuit with a series arrangement of a plurality of pre-assembled cables, each of which has a first cable end and a second cable end which lies opposite the first cable end. Each of the pre-assembled cables has a conductor and a conductor insulation. The cable ends are processed for the wiring of an electrical circuit in such a manner that a respective conductor end is insulation-free at the first cable end and at the second cable end, and connections between adjacently (Continued)

Figure 1:
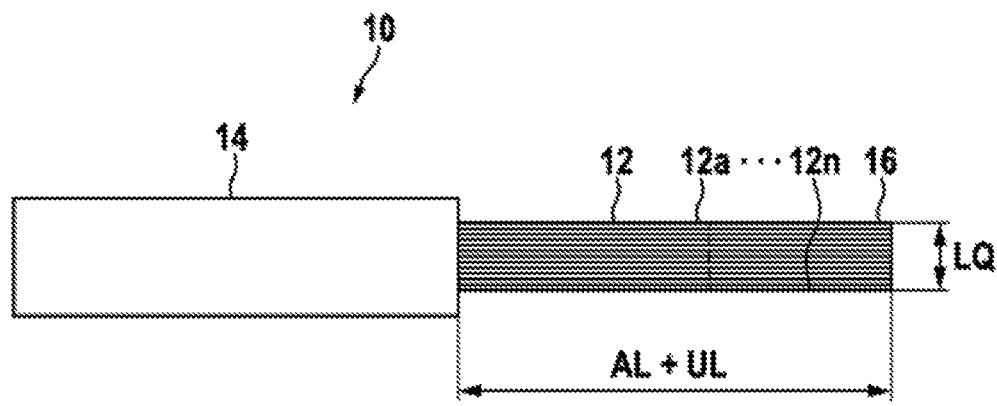

arranged pre-assembled cables in the series arrangement. By way of the connections, in each case a first cable end of a pre-assembled cable, produced beforehand as free cable end, and a second cable end of a next pre-assembled cable in the series arrangement, produced beforehand as free cable end, are connected to one another.

16 Claims, 14 Drawing Sheets

(51) Int. Cl.
    *H01R 11/28*     (2006.01)
    *H02G 1/06*     (2006.01)
    *H02G 15/08*     (2006.01)
    *H01R 43/28*     (2006.01)

(56) References Cited

U.S. PATENT DOCUMENTS

| | | | | |
|---|---|---|---|---|
| 868,460 A * | 10/1907 | L'Hoest | H01R 4/60 174/84 S |
| 1,368,686 A * | 2/1921 | Bennett | H01T 1/00 123/146.5 R |
| 1,657,933 A * | 1/1928 | Lindsley | H01R 4/12 174/84 S |
| 1,955,005 A * | 4/1934 | Maloney | H01R 3/08 174/84 S |
| 1,975,244 A * | 10/1934 | Wiseman | F16B 7/22 16/DIG. 41 |
| 1,975,885 A * | 10/1934 | Wellman | 174/84 S |
| 2,009,318 A * | 7/1935 | Highfield | H01R 4/5025 174/84 S |
| 2,308,811 A * | 1/1943 | Jackson | H01R 13/22 174/84 S |
| 2,470,423 A * | 5/1949 | Alford | H01R 4/2412 174/84 S |
| 2,549,665 A * | 4/1951 | Conrad | H01R 4/5025 174/84 S |
| 3,155,136 A | 11/1964 | Laskowski | |
| 3,401,371 A * | 9/1968 | Hammond | H01Q 1/088 174/84 S |
| 3,409,866 A * | 11/1968 | Roggeveen | H01R 13/052 403/182 |
| 3,525,799 A * | 8/1970 | Ellis | H01R 4/723 174/84 R |
| 3,688,245 A * | 8/1972 | Lockshaw | H01R 11/11 439/436 |
| 3,779,658 A * | 12/1973 | Caperton | F16B 7/182 403/339 |
| 3,814,529 A * | 6/1974 | Caperton | F16B 7/22 403/393 |
| 3,999,288 A * | 12/1976 | Diggs | H01B 7/0009 29/864 |
| 4,129,744 A * | 12/1978 | Cunningham | H01R 4/625 174/94 R |
| 4,196,960 A * | 4/1980 | Gelfand | H01R 11/12 439/874 |
| 4,271,329 A * | 6/1981 | Perelmuter | D04C 1/02 174/84 R |
| 4,347,651 A | 9/1982 | Inoue et al. | |
| 4,465,059 A * | 8/1984 | French | F24D 17/0021 126/635 |
| 4,590,329 A * | 5/1986 | Potochnik | H01R 13/59 174/76 |
| 4,629,274 A * | 12/1986 | Pollock | H01R 4/5075 439/410 |
| 4,645,373 A * | 2/1987 | Purdy | F16B 7/042 403/341 |
| 4,646,323 A | 2/1987 | Meinzer | |
| 4,740,656 A * | 4/1988 | Rich | H01R 4/22 174/84 S |
| 5,006,286 A * | 4/1991 | Dery | H01R 4/04 174/76 |
| 5,217,392 A * | 6/1993 | Hosler, Sr. | H01R 9/0503 174/88 C |
| 5,315,065 A * | 5/1994 | O'Donovan | H01R 4/20 174/84 C |
| 5,432,299 A * | 7/1995 | Ochi | H01R 4/20 174/138 F |
| 5,527,191 A * | 6/1996 | Bevis | H01R 4/38 439/287 |
| 5,683,273 A * | 11/1997 | Garver | H01R 4/5025 174/84 R |
| 5,724,730 A * | 3/1998 | Tanaka | B29C 45/14639 174/76 |
| 5,906,044 A * | 5/1999 | Fujii | B23K 20/10 29/860 |
| 5,925,852 A * | 7/1999 | Hinz | H01B 17/30 174/652 |
| 5,998,736 A * | 12/1999 | Rumsey | H01R 13/53 174/84 R |
| 6,196,861 B1 * | 3/2001 | Saligny | H01R 4/2433 439/395 |
| 6,376,773 B1 * | 4/2002 | Maegawa | H01R 12/63 174/117 F |
| 6,538,203 B1 * | 3/2003 | Nolle | H01R 4/62 174/84 C |
| 6,773,311 B2 * | 8/2004 | Mello | H01R 4/5075 439/783 |
| 6,865,796 B1 | 3/2005 | Oohashi et al. | |
| 8,931,685 B2 * | 1/2015 | Kataoka | H01R 4/021 228/110.1 |
| 9,882,292 B2 * | 1/2018 | Koto | H01R 4/625 |
| 10,109,929 B2 * | 10/2018 | Zukowski | H01R 4/12 |
| 10,128,628 B2 * | 11/2018 | Ootsuka | H01R 4/18 |
| 10,218,091 B2 * | 2/2019 | Yanai | B60R 16/0215 |
| 2003/0027464 A1 * | 2/2003 | Sai | H01R 43/007 439/884 |
| 2003/0073348 A1 * | 4/2003 | Ries | A61N 1/3752 439/578 |
| 2004/0029454 A1 * | 2/2004 | Onuma | H01R 11/28 439/747 |
| 2004/0134062 A1 * | 7/2004 | Jonli | H01R 4/021 29/872 |
| 2006/0121773 A1 * | 6/2006 | Ichikawa | H01R 4/70 439/408 |
| 2006/0196687 A1 * | 9/2006 | Bryla | H02G 1/14 174/92 |
| 2011/0136375 A1 * | 6/2011 | Hatton | H01B 7/0869 439/502 |
| 2012/0279748 A1 * | 11/2012 | Martens | H01R 4/00 174/80 |
| 2015/0060135 A1 * | 3/2015 | Handel | B23K 20/2336 174/74 R |
| 2015/0180138 A1 * | 6/2015 | Ohnuma | H01R 4/62 174/84 C |
| 2016/0071630 A1 * | 3/2016 | Sugino | H02G 15/1806 174/68.3 |
| 2017/0229797 A1 * | 8/2017 | Wurm | H01R 11/01 |

FOREIGN PATENT DOCUMENTS

DE           43 21 007 A1     1/1995
EP            0 143 936 A1     6/1985

* cited by examiner

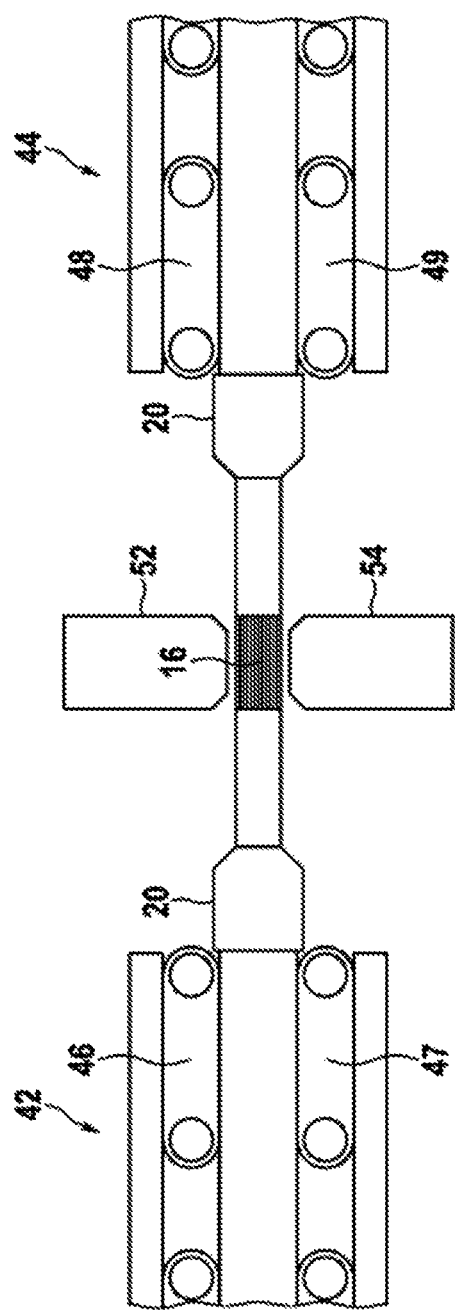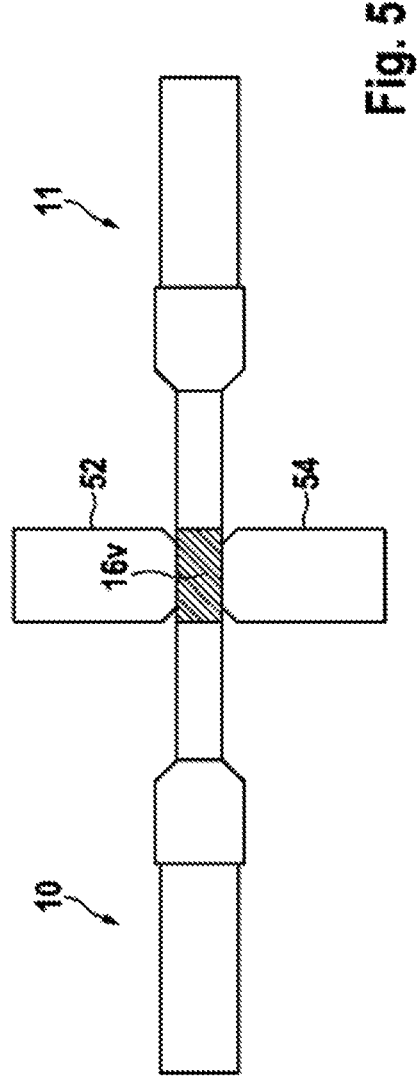

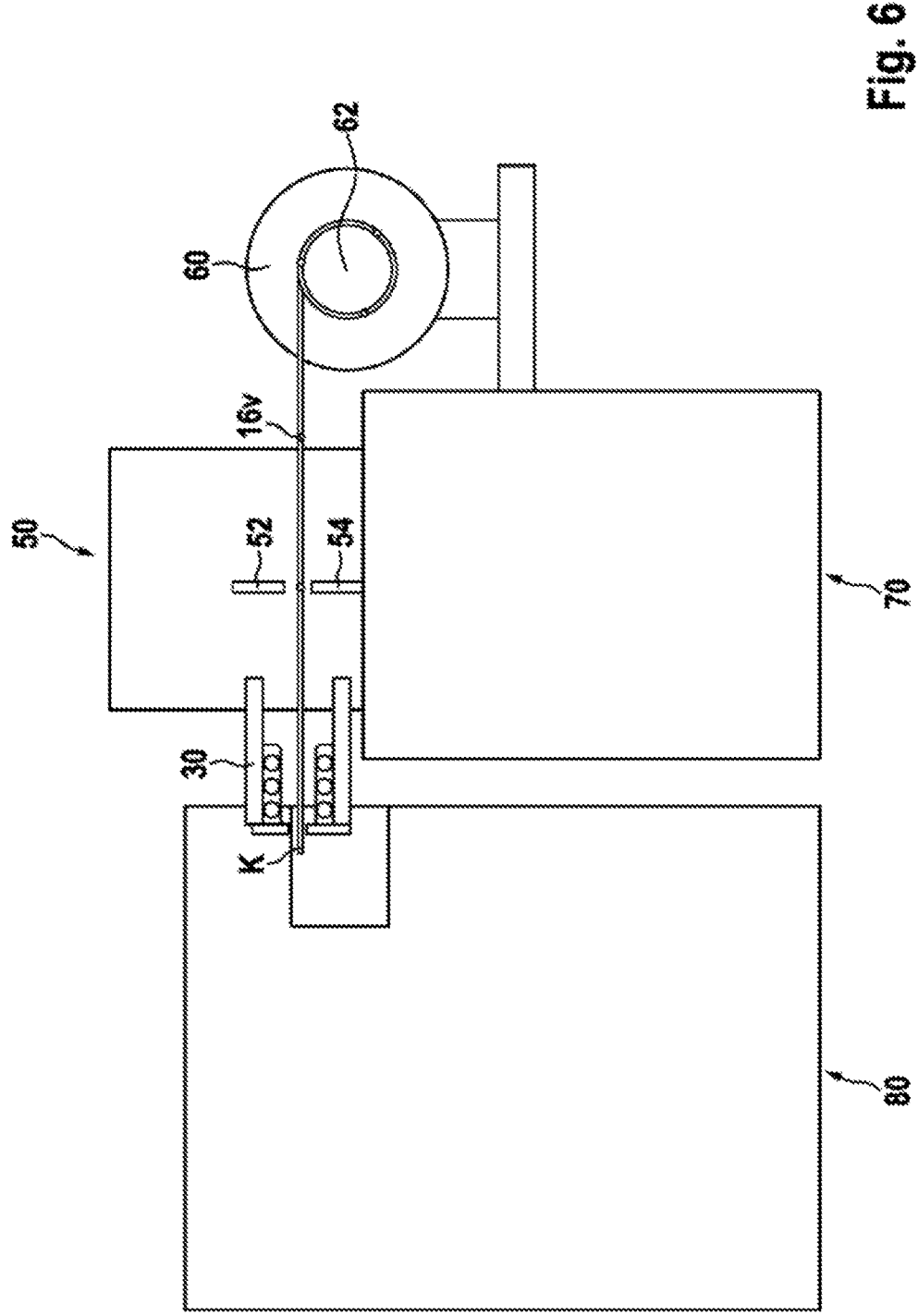

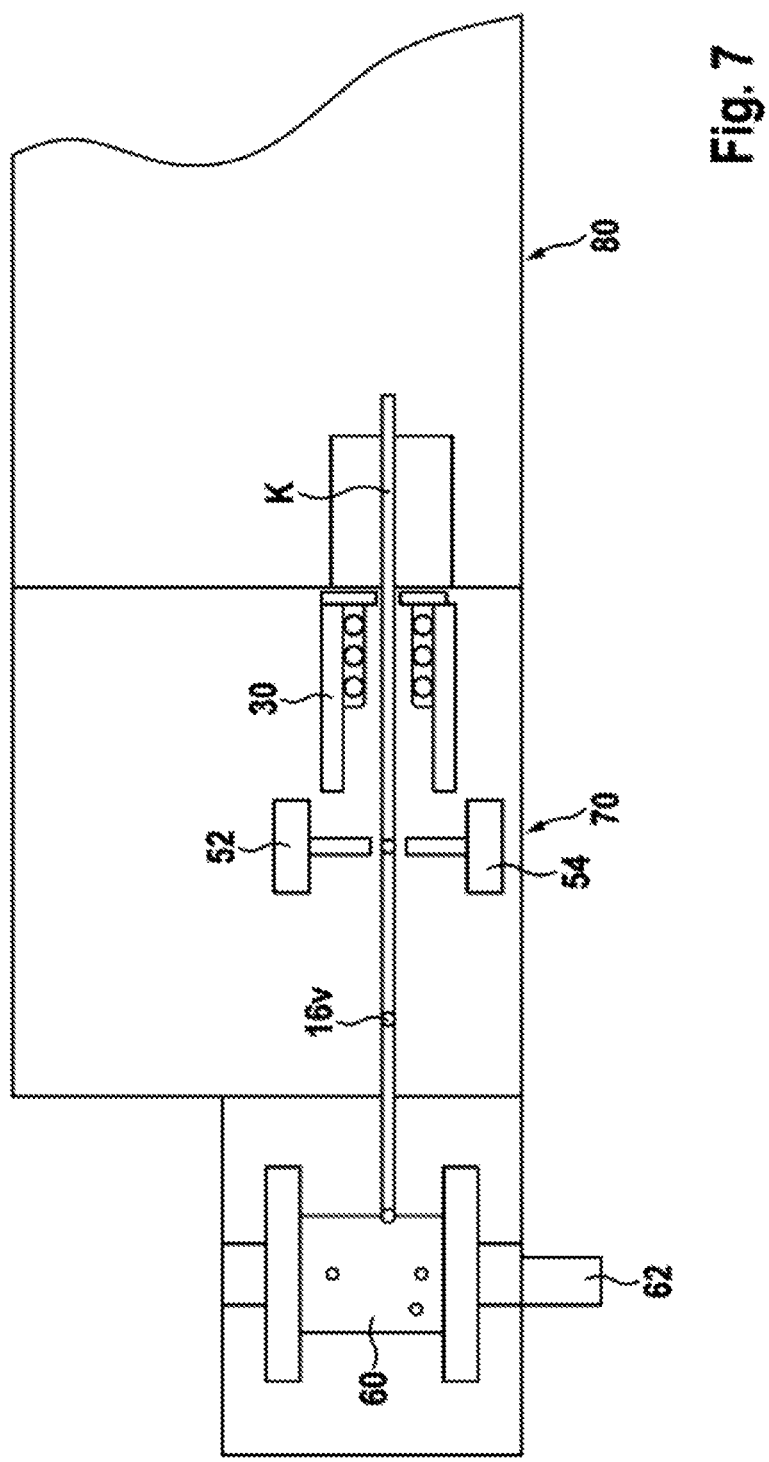

CABLE SEQUENCE FOR A WIRING OF AN ELECTRICAL CIRCUIT, METHOD FOR PRODUCTION AND USE

CROSS-REFERENCE TO RELATED APPLICATIONS

This application is a 371 U. S. National Stage of International Application No. PCT/DE2015/100427, filed on Oct. 15, 2015, which claims priority to German Application No. 10 2014 114 937.8 filed on Oct. 15, 2014. German Application No. 10 2014 116 772.4, filed on Nov. 17, 2014 and German Application No. 10 2015 103 444.1, filed Mar. 10, 2015. The entire disclosures of the above applications are incorporated herein by reference.

FIELD

The disclosure relates to a cable sequence for wiring of an electrical circuit, to a method for production and to the use of the cable sequence.

BACKGROUND

This section provides background information related to the present disclosure which is not necessarily prior art.

The automatic laying and wiring of cables of an electrical circuit is desired in many areas, for example, in the mounting of a switching installation or in a switch cabinet for energy distribution. Automatic cable pre-assembly machines are commercially available, for example, the automatic machine known under the name of KOMAX ZETA, which is marketed, for example, by Komax Deutschland GmbH, Nuremberg, Federal Republic of Germany. The pre-assembled cables then have to be organized in such a manner that in the end they reach the switching installation and are integrated there in the electrical circuit for the intended purpose.

Conventionally, pre-assembled cables are bundled, so that they can be selected later for wiring, removed from the bundle, and introduced into the electrical circuit. For this purpose, storage containers have to be provided, and, in addition, it is difficult to handle excessively long cables. In the document DE 43 21 007 A1, it is proposed to process a cable roll, which thus comprises a cable with a uniform line cross section and a line insulation with uniform properties, in such a manner that it is insulated at designated sites in accordance with a desired cable length and the bare conductor is compacted by ultrasound, wherein, optionally, the line insulation is compressed. Finally, the insulated site is provided with a notch, in order to mark a predetermined breaking point for the user. However, the separation into individual cables has to occur manually. In the process, a considerable simplification of the wiring is already achieved in that the sequence of cables pre-assembled in this manner can be selected in such a manner that the cables are connected to one another in a mounting sequence. In the case of the known cable sequence and the known method for generating and handling such a cable sequence, the use of a uniform cable roll in the preparation for the wiring is provided.

In the document U.S. Pat. No. 3,155,136, a method and a device for producing wire connector assemblies are disclosed.

In the document U.S. Pat. No. 6,865,796 B1, a method is disclosed for thinning a wire section, in that, in particular, the insulation is removed in order to provide in this way a separation or cutting area for the subsequent cutting through.

The document DE 33 27 583 A1 relates to a method for producing cable harnesses, wherein, in the process, individual conductors are cut to length from a cable, insulated, and provided with plugs. The prefabricated individual conductors are subsequently combined to form the cable harness.

In the document EP 0 143 936 A1, a device for connecting or compacting electrical conductors is described. In order to compact electrical conductors such as stranded wires by ultrasound or to weld them to a node point, it is proposed that the sonotrode of an ultrasound welding device comprises a surface centrally above or below the sonotrode longitudinal axis, surface which is associated with a surface of an anvil for the upper and lower delimitation of a compaction space intended for the conductor.

The document U.S. Pat. No. 4,646,323 relates to a method and to a device for producing serially connected cables made of strips of flat multiple conductors.

In the document DE3020233, a device for the automatic preparation of a series of electrical conductor sections and for the insertion of the end of the section in a housing is disclosed.

SUMMARY

This section provides a general summary of the disclosure, and is not a comprehensive disclosure of its full scope or all of its features.

Therefore, it is the aim of the disclosure to provide a cable sequence for wiring of an electrical circuit, a method for production and a use, which support the provision of application-specific cable sequences and the efficient use thereof in the wiring.

According to an aspect, a cable for wiring of an electrical circuit is provided, which comprises a series arrangement of a plurality of pre-assembled cables. The pre-assembled cables in each case comprise a first cable end and a second cable end which lies opposite the first cable end. Each of the pre-assembled cables comprises a conductor and a conductor insulation. The cable ends are processed for the wiring of an electrical circuit in such a manner that a respective conductor end is insulation-free at the first cable end and at the second cable end. In the series arrangement, connections are produced between adjacently arranged pre-assembled cables. By means of the connections, in each case a first cable end of a pre-assembled cable, produced beforehand as free cable end, and a second cable end of a next pre-assembled cable in the series arrangement, produced beforehand as free cable end, are connected to one another.

According to another aspect, a method for producing a cable sequence for wiring of an electrical circuit is generated, which comprises the following steps: providing of a plurality of individual pre-assembled cables, which in each case comprise a first cable end and a second cable end which lies opposite the first cable end, wherein each of the pre-assembled cables comprises a conductor and a conductor insulation, and wherein the cable ends for the wiring of an electrical circuit are processed in such a manner that a respective conductor end is insulation-free at the first cable end and at the second cable end; and production of a cable sequence with a series arrangement of pre-assembled cables consisting of a plurality of individual pre-assembled cables, in that connections are produced between adjacently arranged pre-assembled cables in the series arrangement in such a manner that, by means of the connections, in each case a first cable end of a pre-assembled cable, produced beforehand as free cable end, and a second cable end of a next pre-assembled cable in the series arrangement, produced beforehand as free cable end, are connected to one another.

Moreover, the use of a cable sequence for the wiring of an electrical circuit is provided, wherein, in the process, the connections between the adjacently pre-assembled cables in the series arrangement are separated, and the electrical circuit is wired with the separated pre-assembled cables.

The pre-assembled cables can be produced beforehand as individual cables or in groups of individual cables with respective pre-assembly in order to then connect the individual cables to form the cable sequence.

The cable sequence pre-assembled or produced for the wiring is formed by means of pre-assembled and individual cables, wherein, for the formation of the cable sequence, free cable ends of the pre-assembled cables are connected to one another, so that a series arrangement of a plurality of pre-assembled cables is produced.

It is possible to provide that the first cable end and the second cable end are free of any type of cable lug and/or free of a final processing. Thus, a cable lug-free or connection element-free design of the cable ends can be provided. In this or other designs, the cable end can be provided unprocessed after insulating, for the formation of the connections in the cable sequence.

It is possible to provide for designing the insulated cable ends as compacted cable ends. As a result, compacted cable ends are provided. By means of compaction, a cable end of exact size in terms of width and height and with solid durability of the welded individual strands with respect to one another can be provided. Thus, the compacting can be useful, for example, with regard to one or more of the following aspects: (i) inserting of lines without ferrules into clamps, (ii) preventing of the splaying of the core ends, and (iii) providing of a precisely defined surface and height to be welded for a subsequent welding process, in order to increase the process reliability of the subsequent connection and to design the geometry of the welding tool more simply.

For the warehousing, storage and/or transporting of the cable sequence, a storage device can be used, for example, a cable roll, onto which the pre-assembled cable sequence is wound.

For the takeover of the pre-assembled cable from an automatic cable pre-assembly machine, it is possible to provide that the type of cable end processing used on the cable ends is known. The further processing can be delimited by the automatic cable pre-assembly machine on insulated cables without subsequent treatment, cables with compacted conductor ends and/or cables with ferrules. Alternatively or additionally, tin-plated cable ends can be provided.

The formation or the pre-assembly of the cable ends for the plurality of pre-assembled cables, which are arranged in the series arrangement of the cable sequence, can be identical or different.

The first cable end and the second cable end can be detachably connected to one another by means of the connection. Alternatively, the first cable end and the second cable end can be connected non-detachably to one another, for example, by welding or soldering. Cable ends can be non-detachably connected to one another, for example, by ultrasound welding. In one design, in particular, non-detachable connecting means that the connected cable ends are to be separated by cutting or shearing, wherein, in contrast thereto, cable ends that are connected detachably to one another can be separated from one another again, without using this or another cutting or shearing separation process, when the pre-assembled cable gathered in the cable sequence is to be provided for the wiring process. The separating of the detachable connection can be carried out by machine.

The first cable end and the second cable end can be arranged apart from one another in the connection. In this design, the first cable end and the second cable end are arranged without touching contact in the cable sequence. Alternatively, the cable ends can be in direct contact with one another, for example, front surfaces opposite one another. It is possible to provide that the first cable end and the second cable end are arranged so that they overlap one another in longitudinal direction of the cables in a detachable or in a non-detachable connection.

The first cable end and the second cable end can be connected to one another in the connection by means of a connection component, on which the first cable end and the second cable end are arranged in a respective associated receptacle. The connection component can be used for the detachable connecting of the cable ends or in addition to a non-detachable connection between the cable ends. The connection component can be implemented in the form of a single piece or multiple pieces. For example, first the parts of the connection component to be connected can be connected with a respective cable end, in order to then join these parts, for example, by means of a plug connection, so that the cables are finally integrated in the cable sequence. Connection components made of plastic or another material can be provided. In the formation of the connection component made of plastic, it is possible to provide for the use of an injected molded component. In the different embodiments, the respective receptacle associated with the cable ends can be formed as a closed or an open sleeve receptacle. For example, the receiving sleeve can be open toward the longitudinal side of the connection component. In this manner, a longitudinal introduction opening for the cable end can be provided, for example, as a slot opening. The connection component can be designed as a snap-on component, which is clipped on the first cable end and/or onto the second cable end.

The connection component can be reusable component. Alternatively, it is possible to provide that the connection component is implemented as a single-use component which cannot be reused after the separation of the first cable end and of the second cable end and therefore needs to be disposed of.

The first cable end and the second cable end can be introduced into a respective associated receiving opening on the connection component. The respective receiving opening can be arranged on the end side on the connection component, for example, in the area of end-side front surfaces. The receiving openings can be formed on opposite end sections of the connection component. The cable ends can be inserted or slid into the respective associated receiving opening, for example, through opposite end-side front surfaces.

An introduction aid can be arranged on the openings. The introduction or insertion aid can comprise a collar that surrounds the opening at least partially. The introduction aid can be designed to be funnel-shaped and to open outward.

The respective receptacle can be arranged for introducing the first cable end and the second cable end in the connection component by means of an introduction or mounting movement in longitudinal direction of the connection component. By means of this introduction movement, for example for inserting the cable ends into the connection component, in one embodiment, the cable ends can be introduced via front-side ends of the connection component. It is also possible to provide that the cable ends can be detached again from the connection component by means of a movement in opposite direction from the connection component. In the process, a traction force acting substantially in longitudinal direction of the connection component can be used.

The respective receptacle can be arranged for introducing the first cable end and the second cable end in the connection component by means of an introduction or mounting movement transversely to the longitudinal direction of the connection component. At least in the area of the respective receptacle, the connection component can have a U- or V-shaped cross section, wherein a longitudinal opening is formed, for example, in slot form, through which the cable end can be introduced in the connection component.

The respective receptacle can be arranged for separating the first cable end and the second cable end again from the connection component by means of a tipping movement relative to the longitudinal direction of the connection component. In the process, the introduction aid provided in one embodiment at the openings of the connection component can be designed so that it limits the tipping movement. Alternatively or additionally, it is possible to provide that the cable ends can be detached again by traction in longitudinal direction of the connection component. Detachability by means of a combination of tipping and traction movement can be provided.

The first cable end and the second cable end can each be individually detachable from the connection component. The two cable ends here can be separated from the connection component independently, without the detachment of one of the two cable ends necessarily causing or requiring the detachment of the other of the two cable ends from the connection component.

The first cable end and the second cable end can each be secured on the connection component by means of a clip or snap-on connection. The catching can occur by means of the conductor and/or the conductor insulation. Additionally or alternatively, a catching by means of a ferrule arranged on the respective cable end can be provided. In the case of the provision of a ferrule, said ferrule alternatively can be accommodated in the connection component without catch. Additionally or alternatively to catching, a clamping of the cable end can be provided.

The first cable end and the second cable end can be enclosed in the area of the respective associated receptacle by wall sections of the connection component. The wall sections can be formed so that they peripherally enclose the respective cable end completely or partially. In the case of partial enclosure, one or more slots and/or non slot-shaped perforations can be provided in the enclosing wall sections.

The receptacles on the connection component, which receive the cable ends, can be arranged on one or more support arms starting from a central section of the connection component and extending to the respective end. In the connection component, the cable ends can be arranged so they are partially exposed, in such a manner that they can be viewed from outside, at least in some sections, in particular through wall perforations.

The receptacles can be arranged so as to receive cable ends of pre-assembled cables having different conductor cross sections. For this purpose, a resilient broadening of the receptacles can be provided.

On the connection component, a gripping or mounting section can be provided, for example, in the central area of the connection component, which is arranged for mechanical gripping and holding of the connection component, for example, in the process of the mounting of the cable ends on the connection component and/or of the detachment of the cable ends from the connection component.

On the connection component, a section protruding from the basic body of the connection component can be provided, for example, in the form of a flat section which, in one design is designed in the shape of a sword. In this area of the connection component and/or another surface section of the connection component, marking and/or information surfaces can be provided, for the arrangement of machine readable information that can be read optically, for example. The information can relate to parameters of the pre-assembled cables connected to the connection component in question. Such information can be applied during the production of the cable sequence, for example, by printing. It is possible to provide that this information is read during use of the cable sequence for the wiring, and evaluated for the performance of the wiring process, for example, for the provision of control signals.

In an alternative embodiment, the connection component can be made of one or more bendable and/or foldable materials which, as desired, can be resiliently bendable, for example, a plastic material, a paper material, a cardboard material, a rubber material, silicone material and/or a film material, wherein the connection component comprises a respective insertion opening for the free cable ends of the first cable end and of the second cable end, into which the associated free cable end can be inserted in a self-retaining manner and detachably, in particular in such a manner that the inserted free cable end extends through the connection component. The self-maintaining fastening, in particular by means of clamps, can be designed based on a positive and/or frictional connection. The connection component can be formed as a sheet made from the material used. A strip shape can be provided for the connection component. In the area of the insertion opening, the connection component can have one or more slots which enable an insertion of the free cable end. In the case of several slots, they can be arranged radially. For example, the slots can extend radially outward starting from an insertion point. An insulation-free conductor end can be inserted partially or completely through the insertion opening. In the case of a complete insertion, the connection component can be slid onto the free cable end up to the area of an adjacent section of the conductor insulation. A ferrule can be inserted partially or completely through the insertion opening.

In connection with the method for producing a cable sequence for wiring, it is possible to provide accordingly the designs explained above in connection with the pre-assembled cable sequence.

In one design, it is possible to provide that, in the case of the at first individually provided pre-assembled cables in the serial arrangement, a first conductor end of a cable that is present overlaps a second conductor end of a next cable in the cable sequence, at least in some sections, and the conductor ends are connected to one another in the overlapping area.

"Specific conductor cross section" (LQ) in the sense used here means that each cable has a certain conductor cross section, which, however, can be different from cable to cable. In other words, the cable sequence can also have cables with non-identical conductor cross section. "Specific conductor insulation" is understood to mean that, in the case of the individual cables, the conductor insulation can differ in terms of material, thickness and color.

At least some of the conductors of the cables can be formed as stranded wires consisting of individual wires.

Each cable end can be provided with a ferrule from which an end section of the respective conductor end protrudes. The protruding end section can define an overlapping area of two successive cables.

The cable sequence can be generated in that the conductor ends are compacted by ultrasound in the overlapping area. An ultrasound compaction can also be provided for conductor ends which are detachably connected in the cable sequence by means of a connection component.

It is possible to provide that cables with different line cross section are present in the cable sequence. Since individual cables are joined, it is possible to adapt the cable sequence to different wiring sequences and wiring conditions of the electrical circuit, wherein the detection of the wiring position can be implemented with software support.

In one design, it is not necessary for the cable sequence of the pre-assembled cable agrees to agree with a wiring sequence of a device, switch cabinet or the like to be wired subsequently. Rather, it is possible to provide that the cables are arranged sorted by line cross section, wherein the cables with larger line cross section can follow cables with smaller line cross section or cables with smaller line cross section can follow cables with larger line cross section, in order to ensure a kind of continuous transition of the cable stiffness. In the process, the cables can be processed, using the line cross section thereof, in decreasing order by size, that is to say from the largest to the smallest line cross section.

Just as the cables can have different cross sections, they can have differently colored conductor insulations, for example. In a known manner, a marking can be printed on the end areas of the line insulation, next to the insulated sites of the respective cable.

According to another aspect, a method can be provided for generating and processing a pre-established cable sequence from a plurality of interconnected pre-assembled cables each with a first cable end and a second cable end which is opposite the first cable end, wherein each of the cables has a conductor with specific line cross section and a specific conductor insulation, which comprises the following steps:

provinding of a plurality of cables cut to length for the wiring of an electrical circuit, wherein the length is increased with respect to the length required for the electrical circuit, in order to provide, at at least one of the cable ends, an overlapping area with predefined length;

removing of the conductor insulation from the cable ends, in order to expose the conductor over a predetermined insulation length and optionally the length of the overlapping area;

final processing of the exposed conductor ends, wherein the overlapping area remains untreated in order to generate pre-assembled cables;

collecting of the pre-assembled cables in accordance with the pre-established cable sequence and joining together of the overlapping areas of the conductor ends of two consecutive cables in the cable sequence;

connecting of the overlapping areas of consecutive cables; and repeating of the steps of collecting, joining together and connecting, until the cable sequence with the pre-assembled cables is completed.

In the meaning used here, "joining together of the overlapping area" means that, for example, in the case of compact conductors, said overlapping areas are placed, pushed or pressed against one another, but, in the case of stranded wires consisting of individual wires, they can also engage in one another.

The method can have additional steps, namely the fastening of the cable sequence to a spool and the spooling of the cable sequence for further transport.

In order to prepare the cable for the wiring, the cables can be separated by cutting off or shearing off of the connected overlapping areas of two successive cables, in such a manner that the length of the cable required for the electrical circuit is complied with. The separating can be carried out by means of two blade arrangements with a spacing corresponding to the length of the overlapping area, comprising blades working in opposite directions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
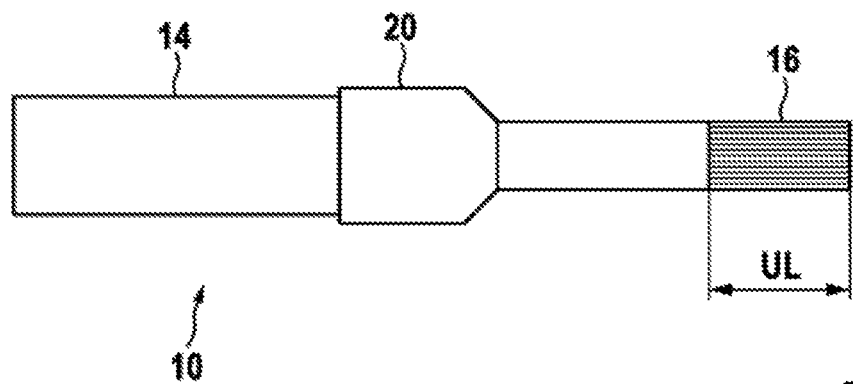
Figure 3:
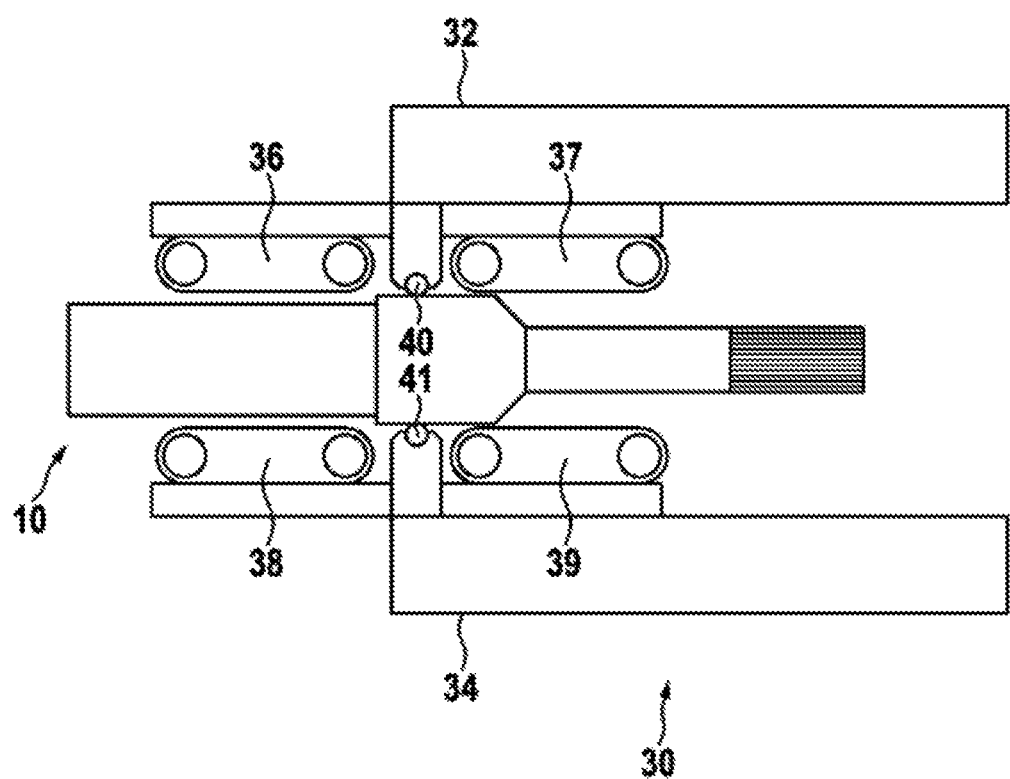
Figure 8:
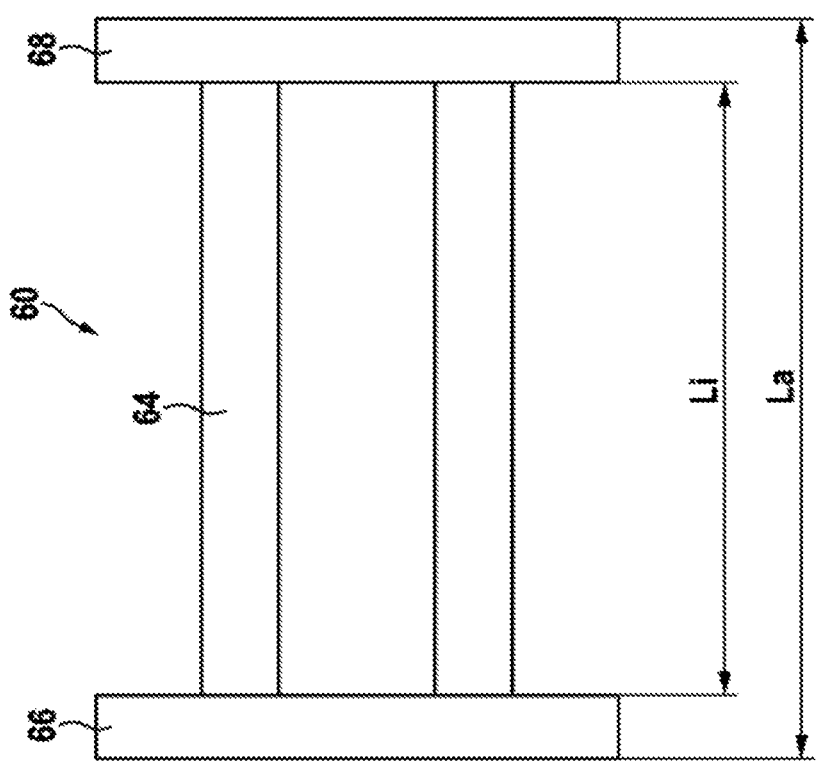
Figure 9:
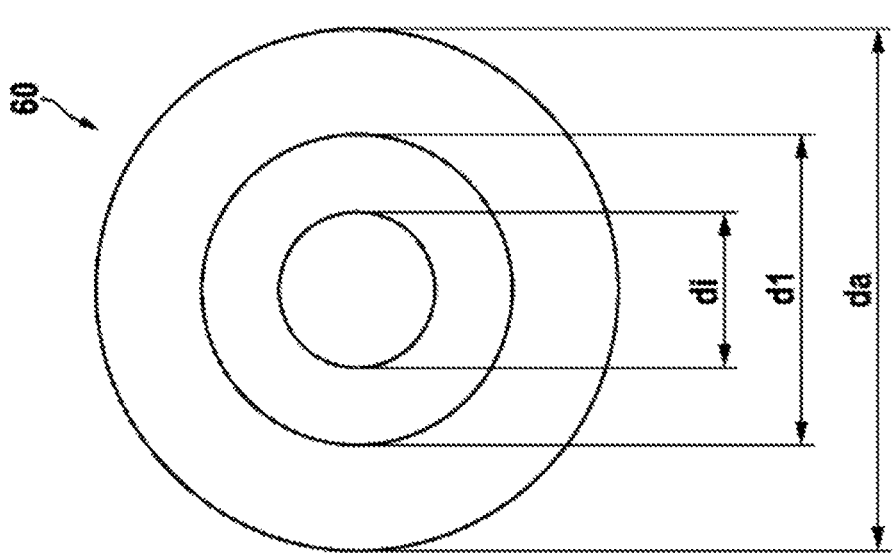
Figure 10:
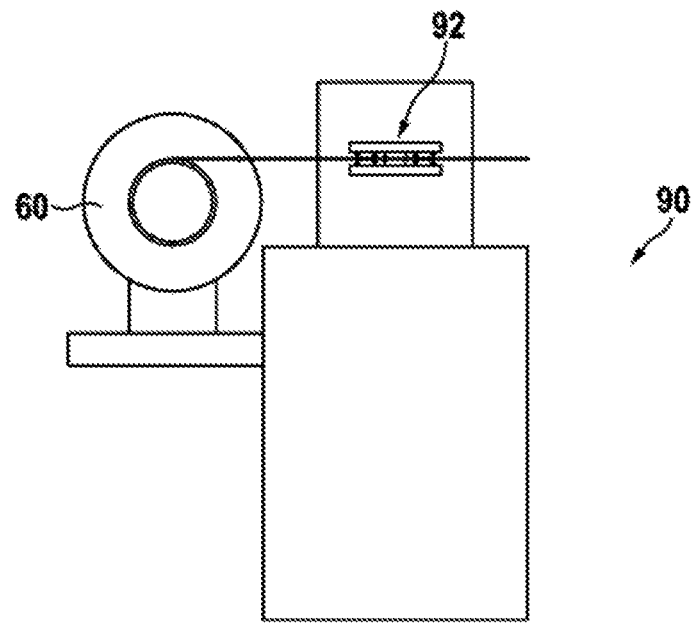
Figure 11:
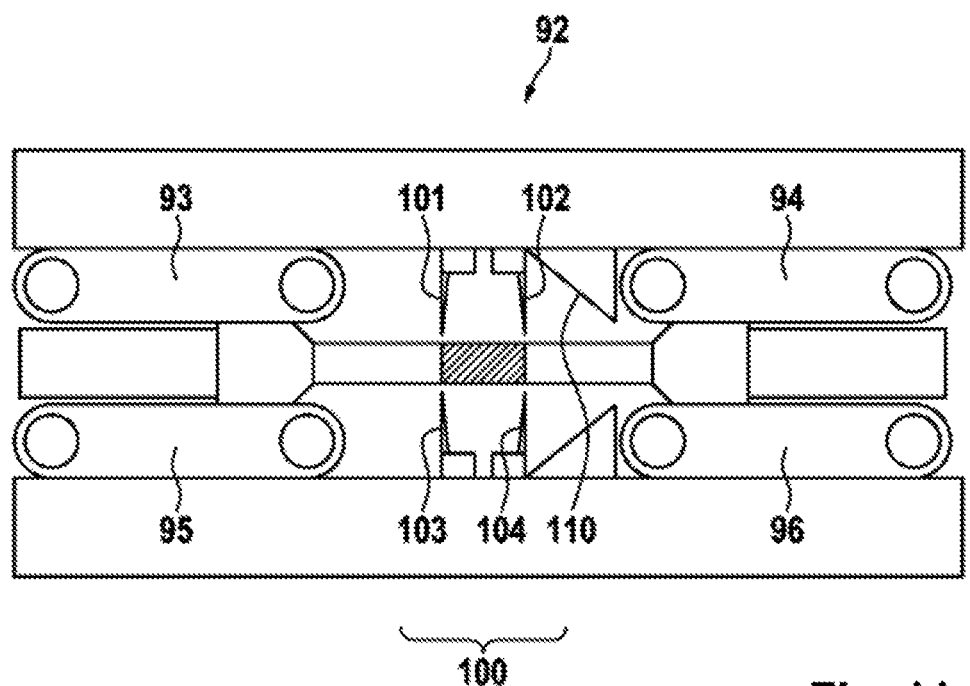
Figure 12:
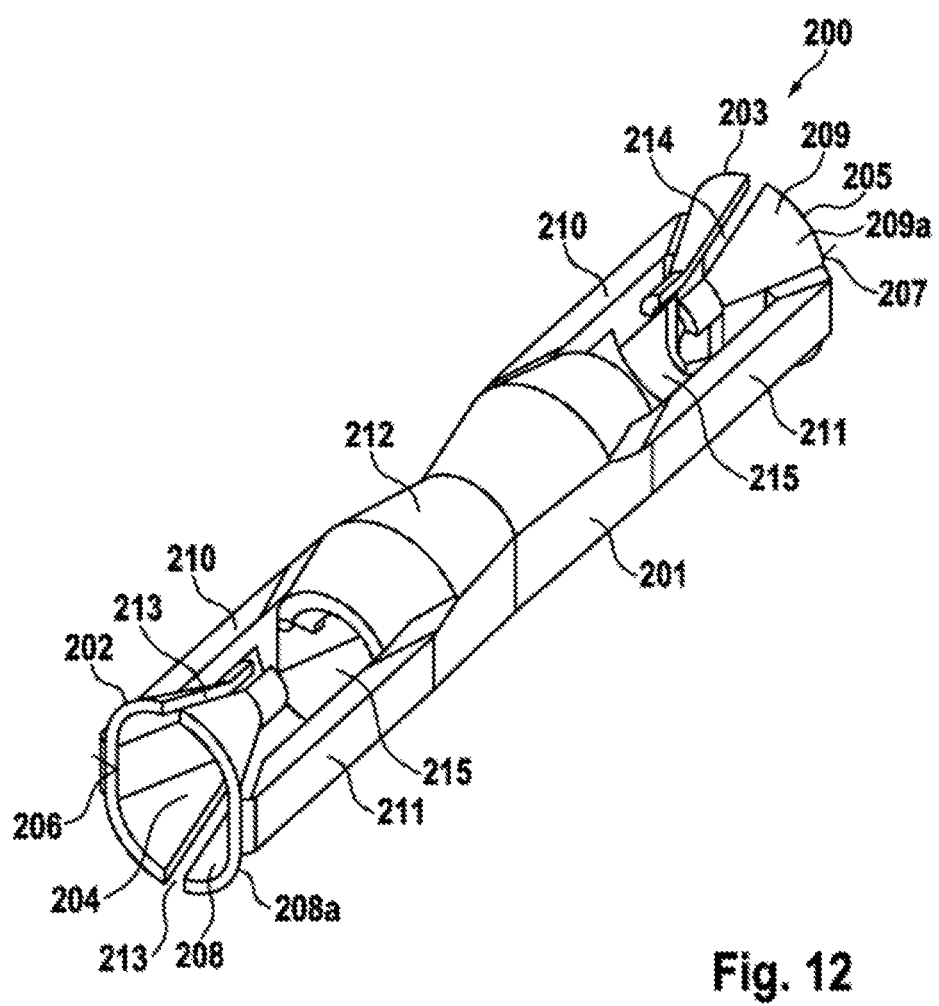
Figure 13:
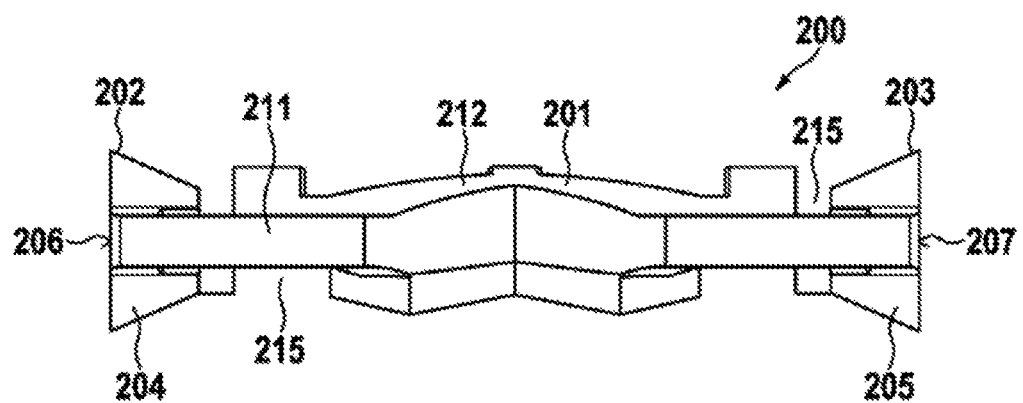
Figure 14:
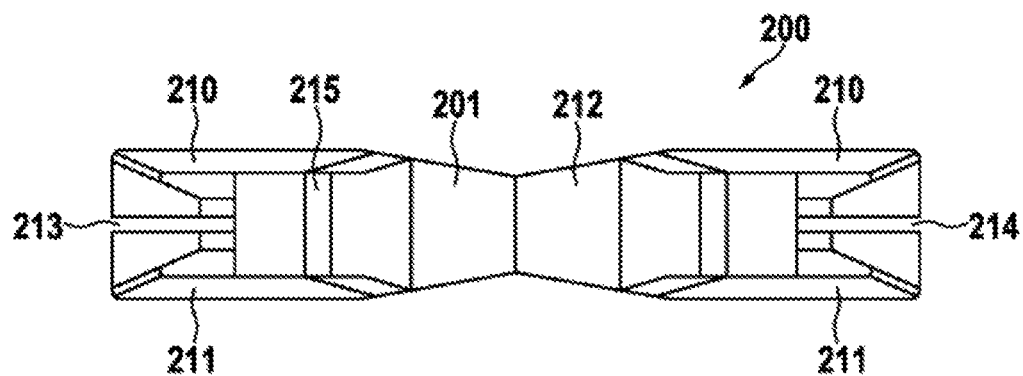
Figure 15:
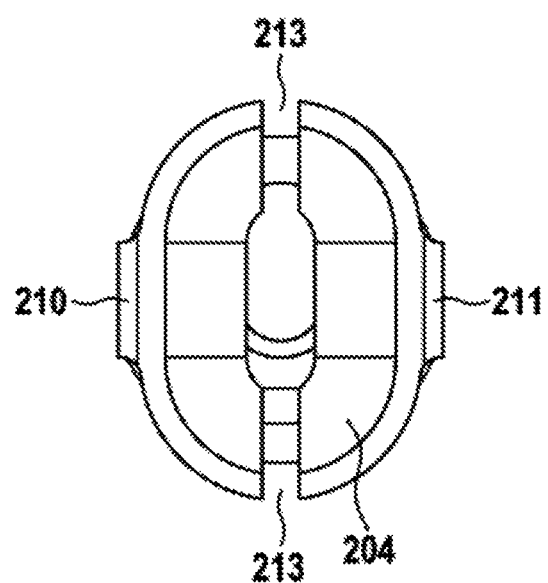
Figure 16:
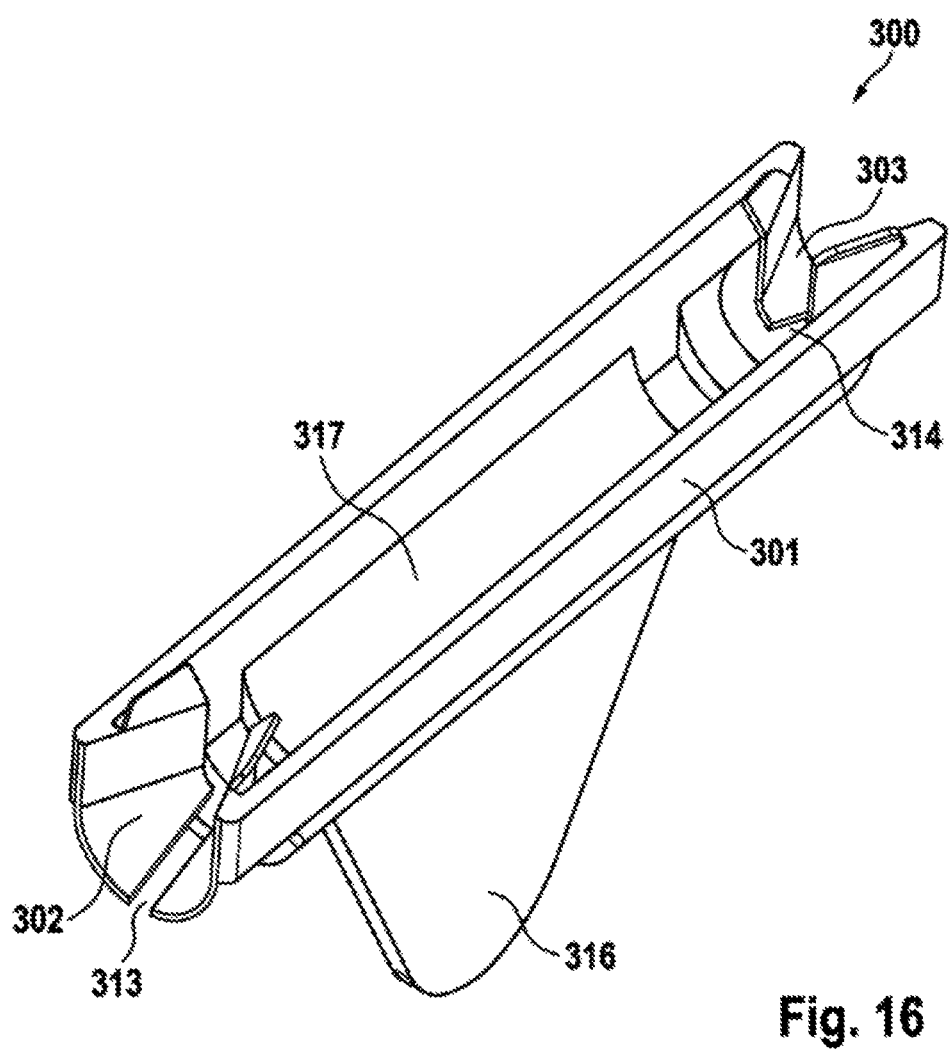
Figure 17:
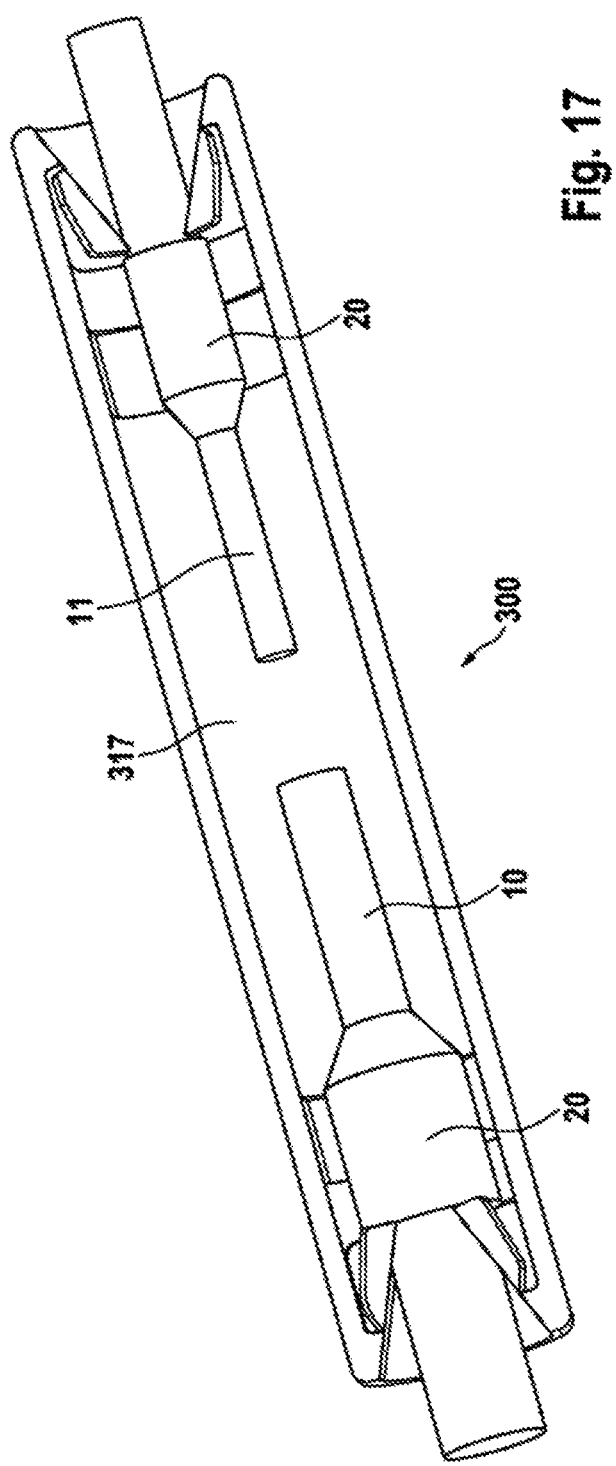
Figure 18:
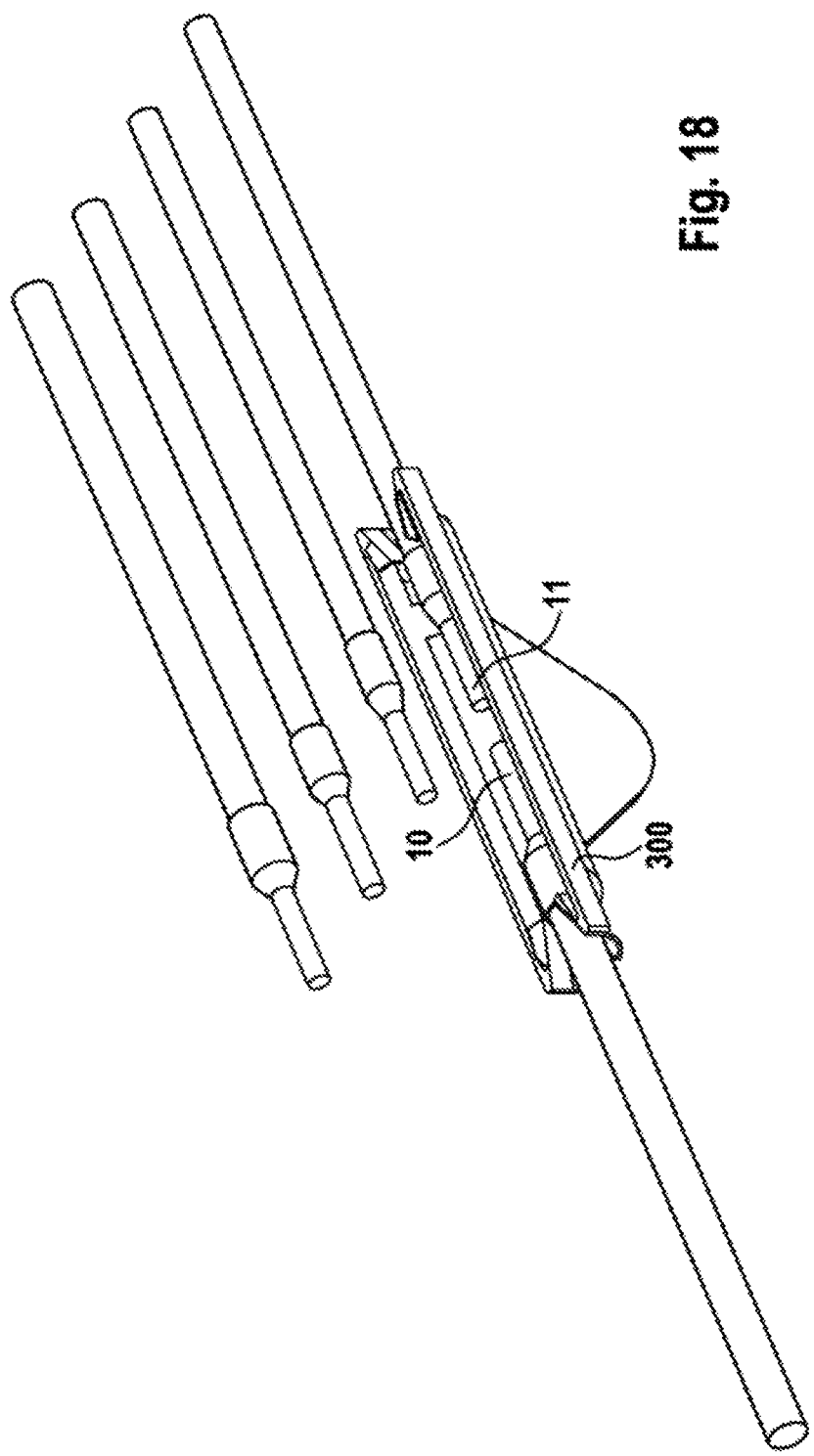
Figure 19:
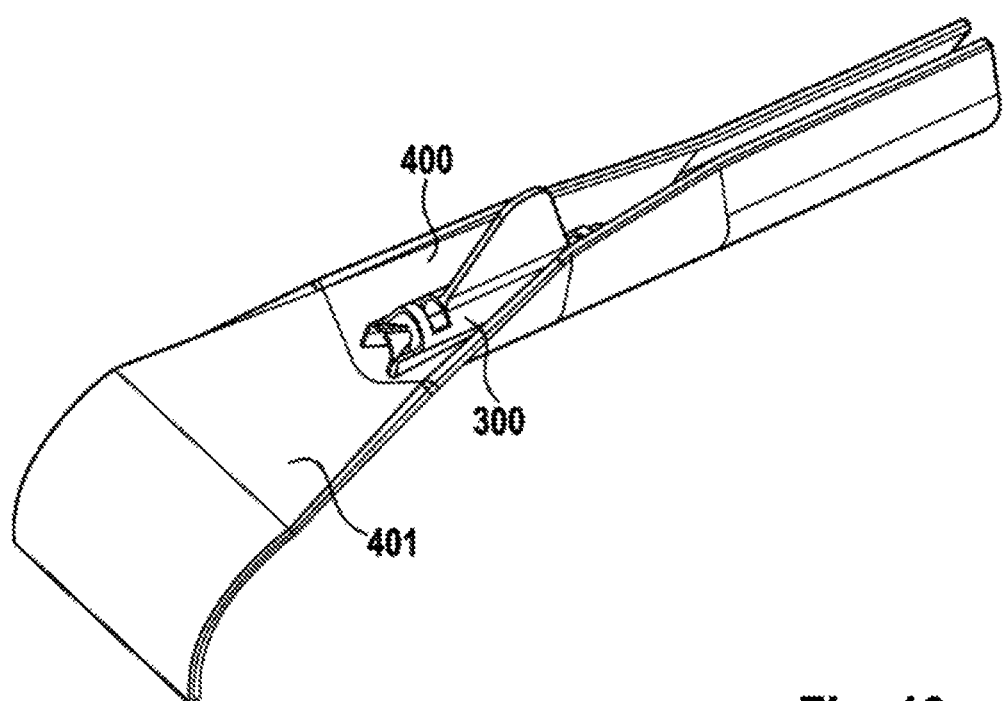

FIG. 1 shows a diagrammatic side view of a cable end of a pre-assembled cable for a cable sequence, FIG. 2 shows a diagrammatic representation of a cable end of an additional pre-assembled cable for a cable sequence, FIG. 3 shows a diagrammatic representation of a takeover gripper for pre-assembled cables, FIG. 4 shows a diagrammatic representation of two pre-assembled cables which are transported to an ultrasound module, FIG. 5 shows a detail representation of FIG. 4, wherein now an ultrasound compacted connection of the two cables occurs, FIG. 6 shows an embodiment of an arrangement for the generation of a cable sequence in a side view, FIG. 7 shows an additional embodiment of an arrangement for the generation of a cable sequence in a top view, FIG. 8 shows a spool for receiving a cable sequence in a front view, FIG. 9 shows the spool of FIG. 8 in a side view, FIG. 10 shows a diagrammatic representation of a separation module, FIG. 11 shows a diagrammatic detail view of the separation unit of the separation module from FIG. 10, FIG. 12 shows a diagrammatic perspective representation of a connection component for the connecting of cable ends in a pre-assembled cable sequence, FIG. 13 shows a diagrammatic representation of the connection component from FIG. 12 from the top, FIG. 14 shows a diagrammatic representation of the connection component from FIG. 12 from the side, FIG. 15 shows a diagrammatic representation of the connection component from FIG. 12 from the front, FIG. 16 shows a diagrammatic perspective representation of an additional connection component for the connecting of cable ends in a pre-assembled cable sequence, FIG. 17 shows a diagrammatic representation of an arrangement with the additional connection component from FIG. 16 and more than one cable end, FIG. 18 shows a diagrammatic representation of an arrangement with the connection component from FIG. 16 and cable ends arranged thereon, and FIG. 19 shows a diagrammatic representation of an arrangement with the additional connection component in a positioning or mounting aid.

Corresponding reference numerals indicate corresponding parts throughout the several views of the drawings.

DETAILED DESCRIPTION

Example embodiments will now be described more fully with reference to the accompanying drawings.

The representations in the figures are not necessarily true to scale. To the extent that reference is made to method or process steps in the description below, they should be understood in the sense that they are to be carried out in an appropriate order, which can also deviate from the described order.

FIG. 1 shows a diagrammatic representation of a first cable end 10 of a cable, which comprises a conductor 12 and a conductor insulation 14 sheathing said conductor, and which is pre-assembled by means of an automatic cable pre-assembly machine. In the process, in a first process step, the cable has been cut to the required length, wherein, at the same time, on the first cable end 10 and on the second cable end (not shown), a labeling, not visible in FIG. 1, is applied to the conductor insulation 14, which is offset by a certain distance toward the cable center. In the example, the cable that has been cut to length is 10 mm longer than needed for the circuit, since, as will be described later, an overlapping area 16 is to be provided at at least one insulation-free conductor end. One of the cables at the end of the cable sequence is only 5 mm longer, since it is connected at only one cable end to another cable. At this cable end, the printing is also carried out in the usual position. After the cutting to length, each cable end is freed of the conductor insulation, so that a first conductor end is insulation-free at the first cable end, and a second conductor end is insulation-free at the second cable end (not shown). The length of the insulation-free conductor end is determined based on the required insulation length AL, increased by the length UL of the overlapping area 16, in the example by 5 mm. In FIG. 1, the conductor 12 of the cable is formed as a stranded wire consisting of individual wires 12a, ... 12n.

In the embodiment provided according to FIG. 1, the pre-assembled cable can continue to be used, wherein the insulation-free conductor ends remain untreated or are ultrasound-compacted, with the exception of the overlapping area 16, or else, as illustrated in FIG. 2, they are provided with a ferrule 20, from which an end section of the conductor end protrudes, which forms the overlapping area 16 of this first cable end 10. The insulation length AL (see FIG. 1) is here predetermined by the ferrule 20 used, and, in addition, the line cross-section LQ of the conductor 12 must be complied with. If the conductor 12 is a stranded wire, as shown in the example of FIGS. 1 and 2, the overlapping area 16 is a brush made of individual wires, which can be brought together with a corresponding brush of an additional cable, in particular if cables with different line cross sections LQ are to be joined.

By means of these steps, the cable is pre-assembled and can then be transported further in order to be connected to another cable. The takeover unit is designed individually in accordance with the automatic cable pre-assembly machine used.

The basic design of a takeover unit can be obtained from FIG. 3, which shows a gripper device 30 as an example, which comprises two jaws 32, 34 opposite one another. On the sides of the jaws 32, 34 which point towards one another, in each case two adjacent conveyor rollers 36, 37 and 38, 39, respectively, are provided, which transport between themselves the pre-assembled cable, of which only the first cable end 10 is represented in FIG. 3, and which are thus mounted in a floating manner. The gripper device 30 is designed so that cables with different line cross sections LQ can be transported reliably. Between the conveyor rollers 36 and 37, and 38 and 39, respectively, which are arranged in pairs, a point gripper 40, 41 is provided on each side of the gripper device 30, by means of which the cable is removed from the automatic pre-assembly machine, in that the point grippers 40, 41 engage, for example, on the ferrule 20 of the first cable end 10. The automatic cable pre-assembly machine can release the cable via an input signal received by the gripper device 30, whereupon the cable is then held by the conveyor rollers 36, 37 and 38, 39, and led to further processing.

FIG. 4 shows, in a diagrammatic representation, how two pre-assembled cables are connected. Each of the cables, of which only a first cable end 10 of one cable that is present and a second cable end 11 of a next cable in the cable sequence are represented, is led by means of a respective transport unit 42, 44 to an ultrasound welding module or moved away from said transport unit in the cable sequence, wherein only two opposite welding electrodes 52, 54 of the ultrasound module are shown in FIG. 4. The transport units 42, 44 have conveyor rollers mounted in a floating manner, for example, 46, 47 and 48, 49, in order to transport the respective cable in the desired direction at the desired speed. By leading the cables to one another, the brushes or overlapping areas 16 of the two cables are caused to overlap and brought under the welding electrodes 52, 54, whereupon, as can be seen in FIG. 5, they are then ultrasound compacted by the welding electrodes 52, 54, so that, between the two cable ends 10, 11, an area 16v with a firmly bonded connection is produced.

Although, in FIGS. 4 and 5, identical cables with identical line cross sections and identical final processing are shown, it is understood that cables with different line cross sections and different final processing can be led together with firmly bonded connection to generate the area 16v.

The interconnected cables K can then be spooled onto a spool 60 with an additional drive 62. Spools 60 with drive 62 transport the cable sequence out of the ultrasound welding module 50, after generation, by means of the welding electrodes 52, 54, of the areas 16v with the firmly bonded connection between the individual cables K supplied by the gripper device 30, which have been provided in the automatic pre-assembly machine 80. The spool 60 can be a component of a line connection module 70, which is represented together with the automatic cable pre-assembly machine 80 in a side view in FIG. 6. The spool 60 wound with the cable sequence can also be brought manually or automatically to the line connection module 70. FIG. 7 shows a variant in which the gripper device 30 is also a component of the line connection module 70 and is not associated with the automatic cable pre-assembly machine 80 as in FIG. 6.

The spool 60 is illustrated in greater detail in terms of the dimensions thereof in FIGS. 8 and 9. The front view of FIG. 8 shows, for the spool 60, an inner diameter di, by means of which the drive 62 turns the spool 60 and winds the cable sequence onto the spool 60. At the beginning, the cable sequence lies on the diameter dl. Here, an auxiliary line is attached, on which the cable sequence is fastened for the connection to the spool 60. If the spool 60 is to be handled as a reusable spool, the auxiliary line is shortened after each use, until, in the end, it has to be replaced with a new auxiliary line. The spool 60 can be wound up to the outer diameter da, wherein the length of the cable sequence to be accommodated is limited substantially by the length Li of the spool body 64 delimited by spool flanges 66, 68. The spool flanges 66, 68 prevent the cable sequence from accidentally slipping off the spool 60. The total spool length La is composed of the length Li and the width of the spool flanges 66, 68.

If the spool 60 is provided with the cable sequence, it can be marked either with a rewritable RFID transponder or a QR code or barcode. The information on the mounting sequence is taken from the automatic cable pre-assembly machine 80 and provided for a separation module 90 which is provided on the switching installation and which is described with reference to FIGS. 10 and 11.

As shown in FIG. 10, the spool 60 is led to the separation module 90. Subsequently, the first cable of the cable sequence is led into a separation unit 92 of the separation module 90 which is shown in detail in FIG. 11. As soon as the first cable is introduced into the separation unit 92, the electronic data set supplied by the automatic cable pre-assembly machine 80 is loaded into the separation module 90. By means of this data set, the software knows in which sequence the cables are arranged, what the length of each cable is, how the cable end processing is carried out, and at which site a separation cut has to be made. In order to determine an exact starting point, the module 90 has to detect the start of the cable via a sensor (not shown). This occurs fully automatically.

Since different cross sections with ferrules or without ferrules as well as different line types with different insulation materials are used, the conveyor, consisting of conveyor rollers 93, 94 and 95, 96 has to be mounted with play. The cable is then conveyed with the connection site 16*v* thereof to a blade arrangement 100. With respect to this blade arrangement 100, the connection site 16*v* of two cables has to be aligned via sensor system 110 between blades 101, 103 and 102, 104 working in opposite directions, for example, V blades, separated by a distance which corresponds to the length UL of the overlapping area 16. The blades 101, 103 and 102, 104 then completely take out the connection site 16*v*, and the cable which is now individual again can be removed and processed. The separation is carried out here in such a manner that the exact length of the cable required is present again. If ferrules 20 are used (FIG. 2), the stranded wire ends up again flush with the ferrule 20 after the separation. In order to now separate off the next cable, the leading cable end thereof is conveyed farther and distinguished by the sensor system 110. The described separation process is then repeated until all the cables of the cable sequence have been processed completely.

In the above described embodiments, it is provided to connect the cable ends 10, 11 of the pre-assembled cables which are opposite one another in the cable sequence in an undetachable manner to one another, in particular by means of the use of ultrasound. Below, in reference to FIG. 12 ff., embodiments are described, in which the cable ends 10, 11 are detachably connected to one another during the production of the pre-assembled cable sequence, wherein a connection component 200 according to FIG. 12 to 15 or an additional connection component 300 according to the design in FIGS. 16 to 19 is used for forming the connection between the cable ends 10, 11. Moreover, the designs explained above in reference to FIGS. 1 to 12 can be provided accordingly in connection with the designs described below.

FIG. 12 shows a perspective representation of the connection component 200. FIGS. 13 to 15 show representations of the connection component 200 from above, from the side and from the front. The connection component 200 has a basic body 201, on which, on opposite ends 202, 203, a respective receptacle 204, 205 for one of the cable ends 10, 11 is provided. The receptacles 204, 205 are implemented as plug-in receptacle in the represented embodiment, in such a manner that, during the production of the cable sequence, for connecting the pre-assembled cables produced individually beforehand, the cable ends are inserted through an introduction or mounting aid 208, 209, in longitudinal direction of the connection component 200 via front-side lateral surfaces 206, 207. The introduction aid 208, 209 is formed with a peripheral collar 208*a*, 209*a* which is implemented as funnel-shaped in the embodiment represented.

The receptacles 204, 205 are held on the basic body 201 by means of support arms 210, 211. The support arms 210, 211 start from a central section 212 which is implemented as a gripping and holding section, so that the connection component 200 can be gripped and held by machine.

In the area of the introduction aids 208, 209, slots 213, 214 are formed, which extend in longitudinal direction of the connection component 200, whereby, when the respective cable end is inserted, a resilient broadening of the receptacle 204, 205 receiving the cable end is possible to a limited extent. In this manner, the receptacle 204, 205 is arranged so as to receive cable ends of pre-assembled cables which have different cross sections.

The connection component 200 is arranged for receiving cable ends which are equipped with a ferrule 20, during the production of the cable sequence (see FIG. 2, top).

The connection component 200 has perforations 215 on the basic body 201, through which an inserted cable end can be viewed at least partially from outside.

In FIGS. 16 to 19, an additional connection component 300 is shown, which can be used in a manner similar to the connection component 200 for the detachable connection of the cable ends 10, 11 during the formation of the cable sequence. On the basic body 301, receptacles 302, 303 are formed, into which the cable ends to be received can be detachably inserted, wherein, in particular, cable ends with a ferrule 20 can be snapped in the receptacles 302, 303, a feature which can also be provided in the case of the connection component 200. In the area of the receptacles 302, 303, a U-shaped cross section is formed, which makes it possible to introduce the cable ends into the receptacles 302, 303 also in an introduction direction transverse to the longitudinal direction of the connection component 300.

In the additional connection component 300, introduction aids 308, 309 are provided, which are implemented as funnel-shaped and with a slot 313, 314. Moreover, the additional connection component 300 has a flat, protruding section 316 which is formed in the shape of a sword in the representation shown.

A groove-shaped section 317 extends between the receptacles 302, 303.

FIG. 19 shows an arrangement in which the additional connection component 300 is arranged in a positioning or mounting aid 400. In the production of the pre-assembled cable sequence, the additional connection component 300 is positioned for mounting on it the cable end to be introduced therein. A ramp 401 can be used as introduction aid.

The features disclosed in the above description, in the drawing and in the claims can be important individually or in any combination for the implementation of designs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A cable sequence for wiring of an electrical circuit comprising:
    a series arrangement of a plurality of pre-assembled cables, each of which has a first cable end and a second cable end which lies opposite the first cable end, wherein each of the pre-assembled cables has a conductor and a conductor insulation, and wherein the cable ends are processed for the wiring of the electrical circuit in such a manner that a respective conductor end is insulation-free and provided with a cable lug at the first cable end and at the second cable end, and
    connections between the cable lugs of adjacently arranged pre-assembled cables in the series arrangement,
    wherein, by means of the connections, in each case the first cable end of the pre-assembled cable, produced beforehand as free cable end, and the second cable end of a next pre-assembled cable in the series arrangement, produced beforehand as free second cable end, are connected to one another.

2. The cable sequence according to claim 1, wherein the first cable end and the second cable end are detachably connected to one another by means of the connection.

3. The cable sequence according to claim 1, wherein the first cable end and the second cable end are arranged apart from one another in the connection.

4. The cable sequence according to claim 1, wherein the first cable end and the second cable end are connected to one another in the connection by means of a connection component, on which the first cable end and the second cable end are arranged in a respective associated receptacle.

5. The cable sequence according to claim 4, wherein the connection component is a reusable component.

6. The cable sequence according to claim 4 wherein the first cable end and the second cable end are introduced into a respective associated receiving opening on the connection component.

7. The cable sequence according to claim 6, wherein an introduction aid is arranged on the openings.

8. The cable sequence according to claim 4, wherein the respective receptacle is arranged for introducing the first cable end and the second cable end in the connection component by means of an introduction movement in longitudinal direction of the connection component.

9. The cable sequence according to claim 4, wherein the respective receptacle is arranged for introducing the first cable end and the second cable end in the connection component by means of an introduction movement transversely to a longitudinal direction of the connection component.

10. The cable sequence according to claim 4, wherein the respective receptacle is arranged for detaching the first cable end and the second cable end from the connection component by means of a tipping movement relative to a longitudinal direction of the connection component.

11. The cable sequence according to claim 4, wherein the first cable end and the second cable end are each individually detachable from the connection component.

12. The cable sequence according to claim 4, wherein the first cable end and the second cable end are each secured on the connection component by means of a clip or snap-on connection.

13. The cable sequence according to claim 4, wherein the first cable end and the second cable end are enclosed at least in the area of the respective associated receptacle by wall sections of the connection component.

14. A cable sequence for wiring of an electrical circuit comprising:
    a series arrangement of a plurality of pre-assembled cables, each of which has a first cable end and a second cable end which lies opposite the first cable end, wherein each of the pre-assembled cables has a conductor and a conductor insulation, and wherein the cable ends are processed for the wiring of the electrical circuit in such a manner that a respective conductor end is insulation-free at the first cable end and at the second cable end, and
    connections between adjacently arranged pre-assembled cables in the series arrangement,
    wherein, by means of the connections, in each case the first cable end of the pre-assembled cable, produced beforehand as free cable end, and the second cable end of a next pre-assembled cable in the series arrangement, produced beforehand as free second cable end, are connected to one another;
    wherein the first cable end and the second cable end are connected to one another in the connection by means of a connection component, on which the first cable end and the second cable end are arranged in a respective associated receptacle; and
    wherein the connection component is a reusable component.

15. Use of a cable sequence according claim 1 for the wiring of the electrical circuit, wherein the connections between the adjacent pre-assembled cables in the series arrangement are separated, and the electrical circuit is wired with the separated pre-assembled cables.

16. A cable sequence for wiring of an electrical circuit comprising:
    a series arrangement of a plurality of pre-assembled cables, each of which has a first cable end and a second cable end which lies opposite the first cable end, wherein each of the pre-assembled cables has a conductor and a conductor insulation, and wherein the cable ends are processed for the wiring of the electrical circuit in such a manner that a respective conductor end is insulation-free at the first cable end and at the second cable end; and
    connections between adjacently arranged pre-assembled cables in the series arrangement;
    wherein, by means of the connections, in each case the first cable end of the pre-assembled cable, produced beforehand as free cable end, and the second cable end of a next pre-assembled cable in the series arrangement, produced beforehand as free second cable end, are connected to one another;
    wherein the first cable end and the second cable end are connected to one another in the connection by means of a connection component, on which the first cable end and the second cable end are arranged in a respective associated receptacle; and wherein the respective receptacle is arranged for detaching the first cable end and the second cable end from the connection component by means of a tipping movement relative to a longitudinal direction of the connection component.

* * * * *